April 2, 1963

J. GOUPIL ET AL 3,084,252

MONITORING OF FISSION PRODUCTS IN A GASEOUS
STREAM, PARTICULARLY FOR DETECTING BURST
SLUGS IN NUCLEAR REACTORS

Filed June 3, 1959

INVENTORS
JEAN GOUPIL
JEAN GRAFTIEAUX
JEAN MEGY

April 2, 1963
J. GOUPIL ET AL
3,084,252
MONITORING OF FISSION PRODUCTS IN A GASEOUS
STREAM, PARTICULARLY FOR DETECTING BURST
SLUGS IN NUCLEAR REACTORS Filed June 3, 1959

3,084,252
MONITORING OF FISSION PRODUCTS IN A GAS-
EOUS STREAM, PARTICULARLY FOR DETECT-
ING BURST SLUGS IN NUCLEAR REACTORS
Jean Goupil, Saint-Germain-en-Laye, Jean Graftieaux,
 Gif-sur-Yvette, and Jean Megy, Paris, France, assign-
 ors to Commissariat a l'Energie Atomique, Paris,
 France, an organization of France
Filed June 3, 1959, Ser. No. 817,811
Claims priority, application France June 23, 1958
6 Claims. (Cl. 250—83.3)

The invention relates generally to fission products monitoring in gaseous streams and more specifically in the gaseous streams discharged from a nuclear reactor so as to detect the leaks or other failures in the jackets or cans surrounding the slugs or cartridges of nuclear fuel in such reactors.

The invention is particularly useful for monitoring heterogeneous reactors, wherein elements or slugs in a fissile or fissionable matter (as uranium or an uranium compound or alloy, possibly enriched in the $U_{235}$ isotope) are positioned in a plurality of channels (often more than thousand channels) pierced in a block of solid modera-tor (as graphite), the heat released by the chain fission reaction of the fissionable material being carried away by a plurality of gaseous streams sweeping said channels in heat-exchange relationship with said elements of fission-able material. But the invention concerns also, more gen-erally, any type of nuclear reactor cooled by gaseous streams.

It is well known that the burst of the fluid-tight jacket surrounding a fissionable fuel element in a nuclear reac-tor has very serious consequences and must, therefore, be detected very promptly; in fact, such a jacket has for an object to prevent, on the one hand, the fissionable element surrounded thereby to be attacked by the gase-ous stream in heat-exchange relationship therewith and, on the other hand, the highly radioactive fission products (which are released by the chain fission reaction in the fissionable material of the fuel element) to reach said gaseous stream.

It was proposed in French Patent No. 1,127,618 filed June 9, 1955 by Commissariat a l'Energie Atomique to detect the bursts of jacketed slugs in gas-cooled nuclear reactors by measuring the radioactivity of the fission products arriving through the bursts of the jackets, in the cooling gas, this measure being realized by one or several nuclear radiation detectors or counters, as scintillation counters, disposed along the passage of gaseous samples picked-up from the cooling gas circuit of the reactor.

Generally the radioactivity measuring unit in a fission products monitor may not be constituted only by a radia-tion detector or counter, e.g. a scintillation counter, be-cause the radioactivity at any moment in a gaseous stream discharged from a nuclear reactor is essentially constituted by the sum of the radioactivities of:

(a) The radioactive isotopes formed in said gas from the non-radioactive constituents thereof under the in-fluence of the neutron flux existing in the nuclear re-actor (for example argon 41 and nitrogen 16 resulting from the neutronic bombardment of argon 40 and nitro-gen 15 of the air, respectively, e.g. when the cooling gas is air) and (b) The fission products (which reached the cooling gas through a burst in a jacket) which comprise: on the one hand, the long-lived fission products which, when the cooling gas is recycled through a nuclear reactor, have a radioactivity appearing in the cooling gas a long time after their arrival in said gas; on the other hand, the short-lived fission products having a radioactivity limited to a very short period subsequent to their arrival in the cooling gas, even if said gas is recycled, due precisely to their short half-life.

It is easily understood that the afore-mentioned long-lived fission products, as well as the radioactive isotopes, falsify the radioactivity measures intended to detect burst slugs and that the sole radioactivity which has to be de-tected and measured—if the passage of fission products in the cooling gas (and also if an increase in the quantity of said fission products in said gas) has to be detected immediately, in order to detect promptly a burst jacket (and to follow the evolution of the burst of said jacket in course of time)—is the radioactivity of the short-lived fission products.

The sensitivity of a detection unit is therefore related to the selectivity of the measure which must be based on features which are particular to the various radioactive elements, as the kind and the energy of their radiations, their half-lifes, their physical conditions.

The present invention is based on the measure of the radioactivity of radioactive ions—as rubidium, cesium, barium and strontium ions resulting from the decay of the gaseous kryptons and xenons having a half-life of a few seconds—which are adsorbed under certain condi-tions by solid bodies. It is in fact well known that, when a gaseous flow including radioactive ions, for example ions daughters of short-lived kryptons or xenons, arrives in a zone where exists an electric field with a voltage gradient directed towards a metallic element, the ions are moved by said field and collected by said metallic ele-ment on which they loose their charge.

The positive ions as rubidium, cesium, barium and strontium are alone adsorbed and their concentration on the metallic element increases in course of time; after a very long collection period, the ion concentration on the metallic element is substantially equal to a limit, for which the ion collection is counterbalanced by the decay or de-activation of the collected ions. The ion concen-tration on such a metallic element reaches therefore, after a determined period, a value which is proportional to the abundance of fission products in the monitored gaseous stream.

As the detector detects not only the short-lived fission products but also the remanent radioactivity of the col-lecting metallic element, if any, and the radioactivity of the gaseous stream itself (which may result from a neu-tron bombardment of the atoms thereof), selective means have to be provided for determining only the radioactivity of the short-lived fission products. In fact in a co-pend-ing patent application of Jean Goupil filed April 20, 1959 for improvements in/or relating to the Detection of Burst Jackets in Nuclear Reactors Cooled by a Plurality of Gaseous Streams, Ser. No. 807,458, the remanent activity was deducted by a special memory unit which subtracted the activity of the metallic element before the ion col-lection from the radioactivity thereof after the ion col-lection, and, in one embodiment of said patent applica-tion shown on FIG. 8 thereof, a continuous metallic wire carried away the collected solid ions outside the radioactive gaseous stream in front of a radiation detector, thereby preventing the radioactivity of said stream to influence said detector. But such a collecting metallic wire has several drawbacks: it has to withstand very high mechanical stresses and therefore breaks from time to time and it is very difficult to repair such a wire traversing a fluid-tight chamber enclosing the radioactive cooling gas, generally under pressure; on the other hand, a precise control of the movements of the wire is very difficult to obtain and therefore the radioactivity measure is falsified, because the radioactive ions collected by a portion of said wire are not brought in their correct position relatively to the detector (geometry error).

The present invention has for an object to obviate the drawbacks of the above mentioned radioactivity monitors.

The invention provides therefore a fission products monitor for gaseous streams, especially for the gaseous streams leaving nuclear reactors, based on the collection of radioactive ions and on the measure of the radioactivity of only the collected ions.

It is still an object of the invention to produce a rugged, precise, selective and sensitive fission products monitor, allowing to detect very quickly the bursts, or other failures, that could occur in the jackets surrounding the fuel elements in a nuclear reactor, by determining the value of the radioactivity of only the short-lived fission products, thereby allowing to follow without material delay the evolution of the failures that may occur in said jackets.

In accordance with the invention, after having eliminated any solid substance from the gaseous stream to be monitored (which may be constituted by a sample picked up from one or several main streams by means of suitable valves), we first pass the stream in a decay zone, wherein the short-lived gaseous fission products of the stream decay to solid products including solid positive ions, then pass the stream with the solid ions in a collecting zone limited along a portion thereof by an area of a rotatable metallic drum and wherein an electric field having a voltage gradient directed towards said area is provided so that the positive ions are collected by said area and we provide means for rotating said drum so that said area thereof is monitored for radioactivity by a radiation detector located on said collecting zone close to said drum, the radiation activity indicated by said detector being substantially proportional to the amount of gaseous fission products in the stream, if the radioactivity of said particular area before said ions were collected thereby is either negligible or deducted.

A device according to the invention for determining the short-lived fission products content in a gaseous stream comprises therefore a decay chamber, a collecting conduit having a wall section thereof formed by a portion of the periphery of a metallic rotatable drum, means for passing said stream successively through said decay chamber and said collecting conduit, means for producing in said conduit an electric field with a voltage gradient directed towards said portion, a radiation detector located adjacent to the periphery of said drum outside said conduit and means for bringing successive areas of said drum to constitute the portion of said drum forming said wall section during a collection period, and in front of said detector during a measuring period.

The electric field is preferably provided by an electrode located at the extremity of said collecting zone or conduit just opposite said area of the drum and brought, at least during the collection periods, to a high positive potential, thereby directing the positive ions towards said area. Further, another electrode may be provided in said decay chamber, said electrode being brought during the time intervals other than the collection periods, to a high negative potential for retaining the positive ions formed in said decay chamber during said time intervals.

In order to take into account the radioactivity of the area of the drum before the ion collection, we determine said previous radioactivity with the same radiation detector just before the ion collection and deduct it from the radioactivity of said area after the ion collection.

Due to this deduction and to the fact that the radioactivity of the gas itself does not influence said detector which monitors only the collected ions, a very accurate and selective determination of the radioactivity of the sole short-lived fission products is performed, thereby enabling to monitor very precisely the variations in course of time of the relative quantity of fission products emitted in the monitored stream, e.g. by a failure in the jackets surrounding the nuclear fuel slugs.

A preferred embodiment of this invention will be hereinafter described with reference to the appended drawings given merely by way of example and in which.

Figure 1:
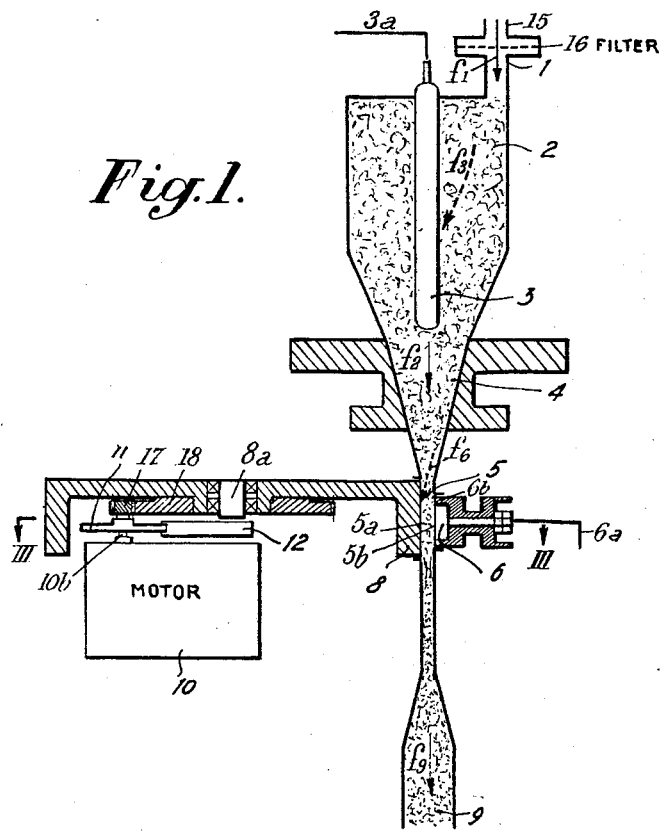
FIGS. 1 to 3 represent three different sections of a device, according to the invention, for measuring the radioactivity of short-lived fission products in a gaseous stream, FIG. 1 being a section along I—I of FIG. 3, FIG. 2 a section along II—II of FIG. 3, and FIG. 3 a section along III—III of FIGS. 1 and 2.

The gaseous stream, in which it is desired to measure the radioactivity of short-lived fission products and to monitor said radioactivity, may be constituted for example by a sample picked up from the effluent of one channel, of one group of channels, or of all the channels of a nuclear reactor of the type shown on FIG. 1 in the above-mentioned patent application and disclosed therein. For example said gaseous stream may be constituted by the sample picked up in a tube, as tube $11a$, $11b$, $11c$ or $11d$, of FIG. 1 of said patent application.

Figure 2:
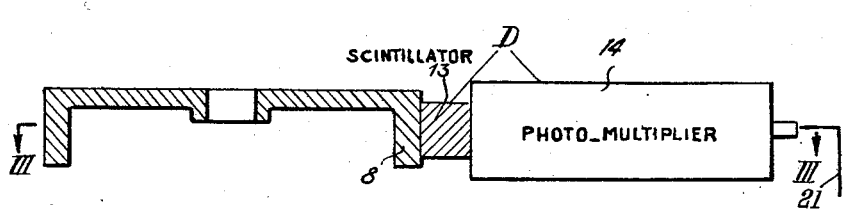
Figure 3:
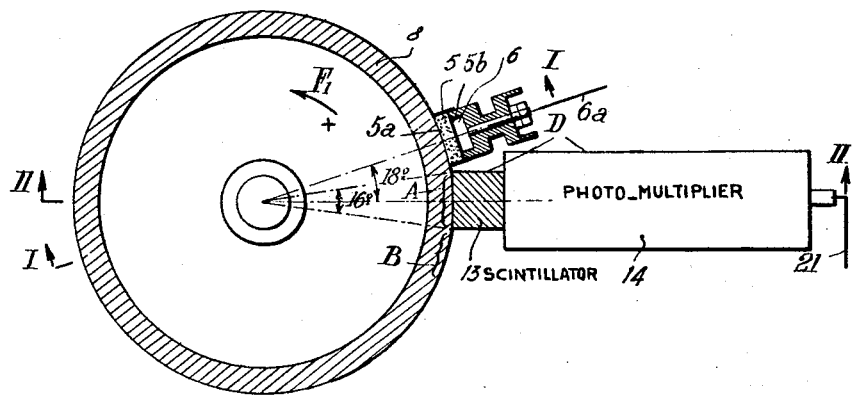

Reference being first made to FIGS. 1 to 3, the gaseous stream, arriving as shown by arrow $f_1$ through duct 15, passes first through a filter 16 which stops all solid particles which could be adsorbed on metallic surfaces later on; the filtered gaseous stream which has passed through filter 16 reaches, by duct 1, a decay chamber or tank 2 having a capacity of about one to two liters, wherein the gaseous stream remains about one second; during this period of time, rubidium, cesium, barium and strontium solid ions are formed as decay products from the gaseous short-lived fission products as the kryptons and xenons.

In said chamber 2 is located an electrode 3 which is normally grounded through a lead $3a$ but which may, when desired, be brought to a high negative potential, also through said lead, in order to attract the radioactive ions formed in chamber 2 according to arrow $f_3$. Said negative potential depends on the gaseous pressure in chamber 2 but is equal to about $-1000$ to $-2000$ volts.

From chamber 2, the gaseous stream, containing radioactive ions when electrode 3 is grounded, reaches, as shown by arrow $f_2$, a tapered duct 4 which has for an object to prevent any turbulence, which would promote on the one hand the ion collection and adsorption on the walls and on the other hand the pressure head losses, and then a cylindrical conduit 5 of reduced diameter.

Figure 4:
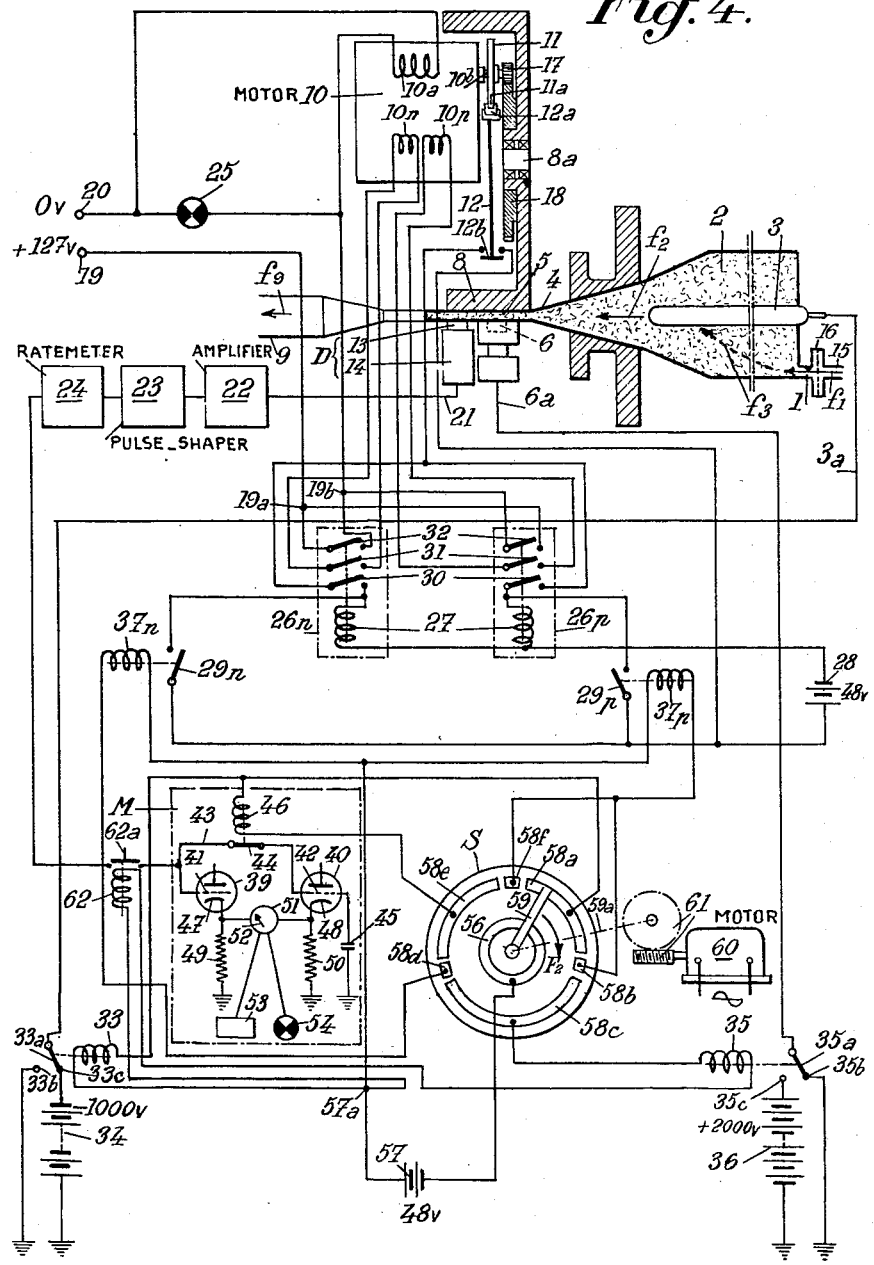
FIG. 4 shows schematically the electrical control circuits for the drum and the electrodes of the device shown on FIGS. 1 to 3.

Said conduit 5 is cut out by two windows or openings $5a$ and $5b$, located in the vicinity of the downstream end of duct 4; said windows $5b$ and $5a$ are respectively closed: by an electrode 6 which may be insulated from the walls of conduit 5 by a ring $6b$ of insulating material, said electrode being adapted to be brought by a lead $6a$, during the ion collection period (when the solid ions are moved according to arrow $f_6$), to a high positive potential (comprised for example between $+1000$ and $+4000$ volts, depending on the pressure of the gas in said conduit, so as to realize an electric field moving the ions away from said electrode; by a portion of a rotable drum 8; this drum carried by shaft $8a$ is driven in rotation in both directions, each time along a limited angular travel, by means of an electric reversible motor 10, the rotation of which is automatically and very precisely controlled by a cam 11 and a microswitch 12, as explained hereinunder with reference to FIG. 4.

In front of another portion of drum 8, is located a radioactivity detector D, for example a scintillation detector including a scintillating substance 13 followed by photomultiplier 14 delivering by a lead 21 in a counting unit not shown on FIG. 2.

The gaseous stream leaves conduit 5 through duct 9 as shown by arrows $f_9$ (arrow in full lines representing gaseous streams and arrows in dotted lines solid ion streams).

The cyclic feeding of electrodes 3 and 6 and the control for the precise rotation of drum 8 are realized by suitable control and switching elements, one embodiment thereof being shown on FIG. 4, on which the device previously described is shown as illustrated on FIG. 1.

As concerns first the rotation in both directions of drum 8 each time for a determined angle, which may be for example equal to 18°, thereby dividing the periphery of said drum in twenty sectors or zones of 18° each, said rotation is realized by reversible electric motor 10 including therefore a main winding 10a fed, between phase 19 (e.g. at 127 volts) and neutral lead 20, in the same time as a signal lamp 25, provided across the terminals of said winding 10a, for visualising the rotation of motor 10, and two auxiliary windings i.e.: an auxiliary winding 10p which, when short-circuited in the same time as winding 10a is fed, determines the rotation of shaft 10b of motor 10 in a first direction called hereinafter "positive direction"; and an auxiliary winding 10n which, when short-circuited in same time as winding 10a is fed, determines the rotation of shaft 10b of motor 10 in the opposite direction or "negative direction."

The simultaneous feeding of main winding 10a and of one of the auxiliary windings 10p or 10n is realized through relays 26p and 26n respectively, both said relays being energized by a battery 28 (e.g. of 48 volts) when the switch arm or armature 29p or 29n is in its on-position. Each relay 26p and 26n comprises a winding 27, a holding armature 30, an armature 31 adapted, when on its on-position, to short-circuit winding 10p or 10n respectively, an armature 32 adapted, when on its on-position, to close the electric circuit feeding main winding 10a between terminal 19a (connected to phase terminal 19) and terminal 19b (connected to the extremity of winding 10a which is not connected to neutral terminal 20).

The holding circuit of both relays 26p, 26n (including holding armature 30) is opened after a complete revolution of the shaft 10b of motor 10 by microswitch 12 as the roller 12a thereof enters in a groove 11a provided in cam 11 (i.e. is in the position shown on FIG. 4). Therefore the closing of the motor actuating electric circuit in 29p or 29n drives motor 10 in the positive or negative direction respectively and shaft 10b of motor 10 performs a complete revolution until microswitch 12 stops said motor, breaking means for said motor being provided for preventing the shaft 10b thereof to exceed such a one revolution rotation; gears 17 on shaft 10b and 18 on shaft 8a of drum 8 have exactly an 1/20 ratio so that drum 8 performs a rotation of 18° for each revolution of shaft 10b, i.e. after each closing of armature or contact 29p or 29n by means described hereinunder.

Electrode 3 which is normally grounded may be brought to a high negative potential attracting solid ions by energizing winding 33 which acts on armature 33a for bringing said armature from its normal or off-position, wherein it rests on grounded contact 33b, to its shown on-position, wherein it connects lead 3a to contact 33c connected to the negative terminal of a high tension source 34 (e.g. of 1000 volts), having its positive terminal grounded.

As concerns electrode 6, it may be brought through lead 6a and armature 35a either to the ground potential of contact 35b (shown position) or, when winding 35 is energized, to the potential of the positive terminal 35c of a battery 36 (e.g. of 2000 volts) having its negative terminal grounded.

The feeding of windings 33 and 35, as well as of windings 37p and 37n (controlling respectively armatures 29p and 29n) may be controlled for example by a single element constituted by a rotating switch S comprising: a conductive ring 56 connected to one of the terminals of a battery 57 (e.g. of 48 volts); contact studs or zones 58a, 58b, 58c, 58d, 58e, 58f connected to point 57a (which is itself connected to the other terminal of battery 57), respectively through windings 33, 37p, 35, 37n, 33, 37p; and a rotatable arm 59 adapted to connect electrically ring 56 successively to contact studs or zones 58a to 58f and so on, said arm 59 being driven in rotation in the direction of arrow $F_2$ by an electric motor 60 through a reducing gear 61, so that arm 59 performs a revolution in e.g. 48 seconds, contact zones or studs 58a to 58f having angular dimensions such that arm 59, rotating at a constant angular speed, connects them to ring 56 during the following durations:

12 seconds for 58a
1 second for 58b
20 seconds for 58c
1 second for 58d
12 seconds for 58e
1 second for 58f these periods with about 1 second between the connections covering the 48 seconds period for one revolution of arm 59.

At last, the output of detector D is applied to an amplifier 22, a pulse-shaping unit 23 and a ratemeter 24 which delivers a signal representative of the number of scintillations produced in scintillator 13 by the radioactive decay of the solid ions present on the zone A of drum 8 which is in front of said scintillator.

The channel constituted by detector D and electronic units 22, 23 and 24 is well known in the art of radiation detection and no further description of said elements is therefore deemed necessary; anyhow such detector and electronic units are fully disclosed in one or several of the following publications: J. Sharpe: Nuclear Radiation Detectors (2nd ed. 1957; Methuen and Co. Ltd., London); D. Taylor: The Measurement of Radio Isotopes (2nd ed. 1957; Methuen and Co. Ltd., London); J. Cork: Radioactivity and Nuclear Physics, chapter 3 (3rd ed. 1957; Van Nostrand Co. Inc., Princeton, New Jersey); Report on "Scintillation Counting 1956," pp. 33 to 64 in the monthly review "Nucleonics" of April 1956 (a MacGraw-Hill publication).

Scintillator 13 may be e.g. an organic substance as tetraphenyl butadiene in polystyrene.

In order to determine only the radioactivity corresponding to the short-lived fiission products, the exit of ratemeter 24, which is proportional to the radioactivity measured by detector D, is applied to a memory device M comprising two triodes 39 and 40 having the grids 41 and 42 thereof connected through a lead 43 and the armature 44 of a relay when said relay is in its rest or off position, i.e. when winding 46 thereof, inserted between winding 33 and contact zone 58e, is not energized. Further, grid 41 is connected to the output of ratemeter 24, whereas grid 42 is connected to one of the armatures of an electricity storing element or capacitor 45 having the other armature thereof grounded. Cathodes 47 and 48 of triodes 39 and 40 are, on the one hand, grounded through resistors 49, 50 and, on the other hand, connected to both inputs of a differential voltmeter 51, the needle 52 of said voltmeter assuming therefore a position which is a function of the difference between the voltages applied on grids 41 and 42.

The output of said voltmeter 51 may be also applied to a recorder 53 and/or to an alarm apparatus 54. The memory unit may be disconnected from the detector by driving in the on-position armature 62a by feeding winding 62 thereof which is inserted in series with winding 35 between point 57a and contact zone 58c.

The operation of the device according to the invention is the following, reference being essentially made to FIGS. 3 and particularly 4.

It is supposed for the following explanation of the operation that at the starting moment arm 59 is on contact zone 58a and one particular area or zone constituting sector A of drum 8 is in front of scintillator 13 (as shown in FIG. 13), said area A corresponding to an angle equal or slightly inferior to 18°, e.g. equal to 16°.

During a first period of about 12 seconds, corresponding to length of contact zone 58a, arm 59 contacts said zone as shown on FIG. 4 and relay winding 33 is energized, thereby applying a high negative potential on electrode 3 which collects the positive ions formed in chamber 2; on the contrary, during same period, electrode 6 is grounded, as winding 35 is not energized. The activity of sector A, which is just in front of scintillator 13 of detector D is determined and, as windings 62 and 46 are not energized and armatures 62a and 44 in the shown position, the activity of said sector A is measured and stored in memory unit M as the charge of capacitor 45. Needle 52 shows "zero" as no voltage difference exists between cathodes 47 and 48 due to the fact that grids 41 and 42 are at a same potential. This first period is therefore a taring period.

Then when arm 59 reaches contact stud 58b, winding 37p is energized and closes armature 29p thereby energizing winding 27 of relay 26p: winding 10a is energized and winding 10p short-circuited thereby starting the rotation of shaft 10b of motor 10 and of drum 8 in the positive direction, shown by arrow $F_1$ on FIG. 3.

Even when arm 59 has left contact stud 58, winding 27 of relay 26 continues to be energized from battery 28 through holding armature 30 thereof. Therefore shaft 10b continues to rotate in the positive direction until, after one complete revolution thereof, microswitch 12 opens in 12b the holding circuit of relay 26p. Through gears 17 and 18, drum 8 has performed an 18° rotation in the direction of arrow $F_1$ (FIG. 3) and is now just opposite electrode 5. As arm 59 is now in contact with zone 58c, windings 35 and 62 are energized: electrode 6 is brought to a positive potential and therefore repels the positive ions passing through conduit 5 (as electrode 3 is now grounded) towards sector A of drum 8 which is now just opposite thereto and collects said ions; further as armature 62a is in its on-position, the output of detector D is not received by memory unit M, which still stores the initial activtiy of area or sector A in capacitor 45. This ion collection period lasts 20 seconds.

At the end of this period, arm 59 reaches contact stud 58b, thereby feeding winding 37n and closing an electric circuit in 29n: winding 27 of relay 26n is therefore energized and feeds winding 10a and short-circuits winding 10n of motor 10 which is driven in the negative direction; winding 27 of relay 26n continues to be fed through holding armature 30 thereof until shaft 10b of motor 10 has performed one complete revolution, when the holding circuit is opened in 12b by microswitch 12. Drum 8 rotates therefore of 18° in the negative direction (opposite to direction of arrow $F_1$) thereby bring back area A in front of scintillator 13 (in the position shown on FIG. 3). As arm 59 has reached contact zone 58e during this rotation in the negative direction, winding 33 is now energized by battery 57: electrode 3 is brought to a high negative potential thereby collecting and holding the positive ions formed in chamber 2 (whereas electrode 6 is brought to the ground potential). Further as winding 62 is not energized, the output of detector D, detecting the radio-activity of the area A having previously collected the solid ions, reaches memory unit M, but as winding 46 is energized with winding 33, the connection between grids 41 and 42 is interrupted in 44 and differential voltmeter 51 compares the present and the past radioactivities detected by detector D: needle 52 of said voltmeter shows the difference between said activities i.e. the true activity of the short-lived fission products collected by area A during the collection period, no radioactive gas being viewed by scintillator 13 which is disposed just against area or sector A (e.g. at a distance of a few tenths of a millimeter). This radioactivity measurement period, corresponding to the passage of arm 59 on contact zone 58e, may last about 12 seconds; at the end of this period arm 59 reaches contact studs 58f, thereby energizing winding 37p and, for the reasons given hereinabove for the prior feeding of winding 37p, motor 10 drives drum 8 in the direction of arrow $F_1$ for an angle of 18°: an area or sector B, which is behind zone A in the direction of $F_1$ arrives in front of scintillator 13 and a new cycle with area B similar to the cycle with area A is started when arm 59 reaches contact zone 58a.

The duration of one cycle for any drum sector as A may be of about 48 seconds; then the duration of twenty cycles (for twenty sectors) is of about 15 minutes. When area A, after such a period of 15 minutes, returns in front of scintillator 13 for a new cycle, the remanent activity thereof is very small due to the decay of the previously collected radioactive ions (this remanent activity is about thirty times smaller than if an apparatus with a stationary metallic ion collector was used).

As concerns the taring means allowing to deduct, from the activity of a given area of drum 8 after ion collection thereon, the activity of said area before the ion collection, it is possible without departing from the scope of the invention to use other means as memory unit M, for example a digital counter wherein are inscribed first as a negative number (i.e. subtracted) the pulses delivered by pulse-shaper 23 during the taring period (arm 59 on zone 58a) and then as a positive number the pulses delivered by unit 23 during the measuring period (arm 59 on zone 58e).

The differential output of said digital counter representing the activity of the short-lived fission products may then e.g. be typewritten by well-known teletyping means.

In a modification of the system according to the invention electrode 3 may be omitted, electrode 6 playing also the part of electrode 3. In such modified apparatus, electrode 6 is brought to a high negative potential during the taring periods (when the remanent activity of an area of the drum is determined) and during the radioactivity measuring period of said area, whereas it is brought to a high positive potential during the collection period between said taring and measuring periods.

In such a modification: terminal 35b is connected to the negative terminal of a battery of about 1000 volts (as battery 34) having its positive terminal grounded, instead of being connected to ground as shown on FIG. 4; and electrode 3 and associated elements 3a, 33a, 33b, 33c, 34, 33, 58a are omitted, zone 58e being connected through winding 46 directly to point 57a.

In another modification, the contacts 29p and 29n could be controlled by cams carried by cam-members secured on shaft 59a of arm 59, the cam-member for contact 29p comprising two cams distant of an angular distance equal to the angular distance between studs 58f and 58b and contact 29n being controlled by a cam-member with a single cam angularly located relatively to the cams acting on contact 29p as contact stud 58d relatively to contact studs 58b and 58f. In such modification the control of electrodes 3 and 6 is performed by a rotating switch S comprising only the contact zones 58a, 58c and 58e without contact studs 58b, 58d and 58f.

In another modification, the metallic drum 8 could have, instead of a circular motion, an helical movement by providing an helical shaft in the axis of the drum, said helical shaft being rotated by motor 10. In such modification a very great number of different collection areas, as A, are provided on drum 8, the period after which a given area is utilized again for ion collection being multiplied by the number of turns of the helix determining the helical movement.

Of course, a monitor according to the invention could be used for monitoring the activity of a plurality of channels in order to detect a burst slug in a given channel of a nuclear reactor. In fact, when the monitored nuclear reactor includes many channels, it is advantageous, for economy reasons, to monitor with a single radiation detecting unit, as suggested in the French Patent 1,127,618 of June 9, 1955, a group of several channels, said detector unit receiving successively gaseous samples from each channel in said group; preferably, other radiation detecting units, including activity recorders, monitor continuously the radioactivity of the effluents from the channels which have previously exhibited an alarmingly high radioactivity.

The necessary switching for monitoring, with a single radiation detecting unit, the effluents from several channels may be realized by means of mechanically or electrically controlled valves or by the static means disclosed in the above-mentioned copending patent application, this switching enabling to direct successively and cyclically on said detecting unit gaseous samples picked up from the effluents of the gaseous channels monitored by this detecting unit.

The device according to the invention may be very advantageously used as such a detecting unit for a plurality of channels in a nuclear reactor.

In a general manner, while we have, in the above description, disclosed what we deem to be a practical and efficient embodiment of our invention, it should be well understood that we do not wish to be limited thereto as there might be changes in the arrangement, disposition and form of the parts without departing from the principle of the present invention as comprehended within the scope of the accompanying claims.

What we claim is:

1. Device for determining the short-lived fission products content in a gaseous stream, comprising a decay chamber, a metallic drum, a collecting conduit having a wall section thereof formed by a portion of the periphery of said drum, means for passing said stream successively through said decay chamber and said collecting conduit, means for producing, at least during determined collecting periods, in said conduit an electric field with a voltage gradient directed towards said portion, a radiation detector located adjacent to the periphery of said drum outside said conduit and means for bringing successive areas of said drum to constitute the portion of said drum forming said wall section during one of said collecting periods and in front of said detector during subsequent measuring periods.

2. Device according to claim 1, wherein said means for producing an electric field comprise a repulsion electrode, a high voltage source having a negative terminal connected to ground and a positive terminal and means for electrically connecting during said determined collecting periods said repulsion electrode to said positive terminal of said source.

3. Device according to claim 2, wherein a precipitation electrode is located inside said decay chamber, and comprising a further high voltage source with a positive terminal connected to ground and a negative terminal and means for electrically connecting said precipitation electrode to said negative terminal of said further source substantially during all time except said determined collecting periods.

4. Device for determining the short-lived fission products content in a gaseous stream, comprising a decay chamber, a precipitation electrode inside said chamber, a first high potential source having a negative terminal connected to ground and a positive terminal, a collecting conduit, a first and a second opening in said collecting conduit, a metallic drum having a portion of the periphery thereof closing said first opening, a repulsion electrode closing said second opening, a second high potential source having a positive terminal connected to ground and a negative terminal, a radiation detector located adjacent to the periphery of said drum outside said conduit, in the vicinity thereof, means for passing said stream successively through said decay chamber and said collecting conduit, means for cyclically connecting during measuring periods said precipitation electrode to said negative terminal of said second source and during collecting periods said repulsion electrode to said positive terminal of said first source and drum-actuating means, synchronised to said cyclically connecting means, for bringing successive areas of said drum in a collection position to constitute the portion of said drum closing said first opening during said collecting periods and in a measuring position in front of said detector during said measuring periods.

5. Device for determining the short-lived fission products content in a gaseous stream, comprising a decay chamber, a precipitation electrode inside said chamber, a collecting conduit, a first and a second opening in said collecting conduit, a metallic drum having a portion of the periphery thereof closing said first opening, a repulsion electrode closing said second opening, a first high potential source having a negative terminal connected to ground and a positive terminal, a second high potential source having a positive terminal connected to ground and a negative terminal, a radiation detector located adjacent to the periphery of said drum outside said conduit, in the vicinity thereof, means for passing said stream successively through said decay chamber and said collecting conduit, means for cyclically connecting during taring and measuring periods said precipitation electrode to said negative terminal of said second source and during collecting periods said repulsion electrode to said positive terminal of said first source, drum-actuating means, synchronised to said cyclically connecting means, for bringing successive areas of said drum first in a taring position in front of said detector during said taring periods, secondly in a collection position to constitute the portion of said drum closing said first opening during said collecting periods and thirdly in a measuring position back in front of said detector during said measuring periods, storing means receiving the output of said detector during each of said taring periods, and comparison means for deducting from the output of said detector during each of said measuring periods the output of said detector during the previous of said taring periods, stored in said storing means.

6. Device according to claim 5, wherein said cyclically connecting means and said drum actuating means comprise a first relay electrically connecting, when energized, said precipitation electrode to the negative terminal of said second source, a second relay electrically connecting, when energized, said repulsion electrode to the positive terminal of said first source, a reversible electric motor with an output shaft rotatable in a first and a second opposite direction, means for transmitting the rotation of said shaft to actuate said drum, a third relay adapted, when energized, to start the rotation of said shaft in said first direction, a fourth relay adapted, when energized, to start the rotation of said shaft in said second direction, means for stopping said motor after a determined rotation of said shaft thereof corresponding to the actuation of said drum for bringing one of said successive areas of said drum from said collecting position to said measuring position as well as from said measuring position to said collecting position and at least one rotating control device occupying successively and cyclically a first, a third and a fifth position of relatively long duration followed respectively by a second, a fourth, a sixth position of relatively short duration, the occurrence of said at least one control device in said first, second, third, fourth, fifth and sixth position producing the energization respectively of said first, said third, said second, said fourth, said first and said third relay.

References Cited in the file of this patent

UNITED STATES PATENTS

| | | |
|---|---|---|
| 2,576,616 | Livingston | Nov. 27, 1951 |
| 2,826,076 | Boretz | Mar. 11, 1958 |
| 2,953,687 | Bergstedt | Sept. 20, 1960 |

OTHER REFERENCES

Wingfield: An Alpha Monitor for Waste Streams, AEC Research and Development Report DP-197, January 1957.

Collins: A Continuous Monitor for Airborne Plutonium, AEC Research and Development Report DP-188, November 1956.

Use of Beta-Ray Densitometry in Paper Chromatography, Analytical Chemistry, vol. 23, No. 1, January 1951, pages 207-208.

Brinkerhoff et al.: Continuous Air Monitor for $H^3$, Nucleonics, vol. 17, No. 2, February 1959, pages 76, 78, 81.